Feb. 16, 1971      A. G. PETERSON      3,562,871
ENDLESS BELT ASSEMBLY WITH INSERT COUPLING
Original Filed July 6, 1967
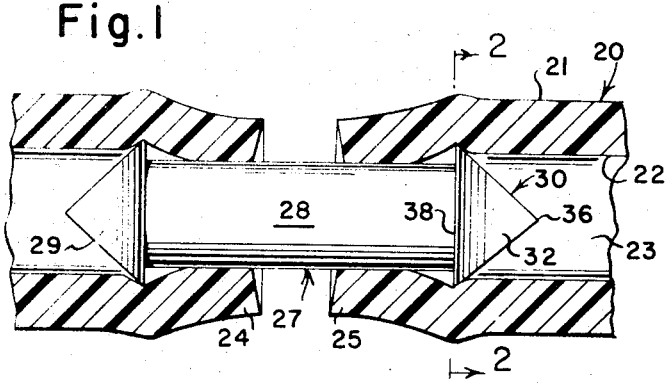
Fig.1
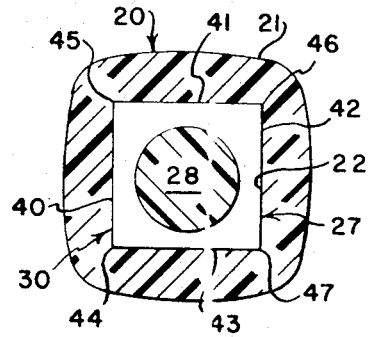
Fig.2
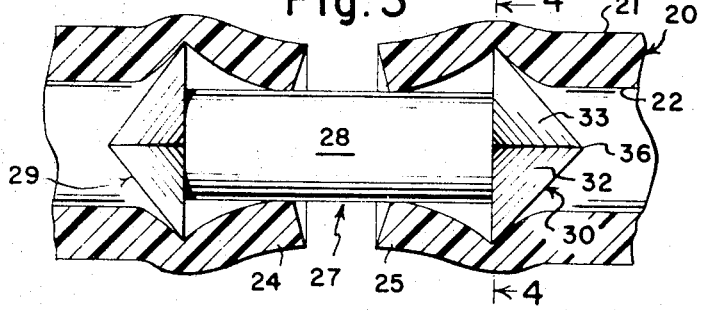
Fig.3
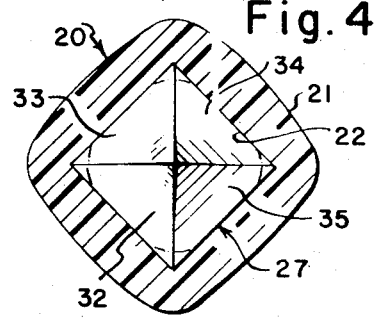
Fig.4
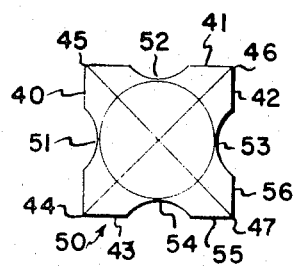
Fig.5
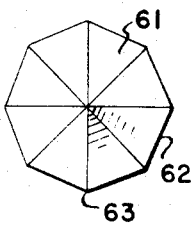
Fig.6
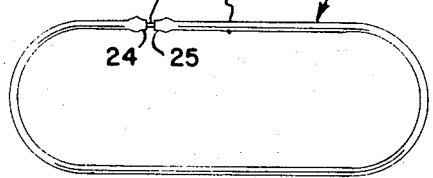
Fig.7
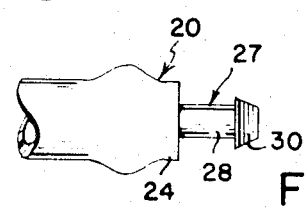
Fig.8
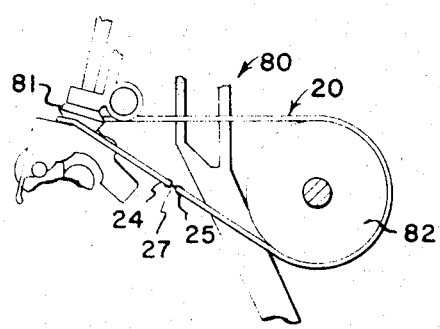
Fig.9
Fig.10
INVENTOR.
Arnold G. Peterson
BY
Pearson + Pearson
ATTORNEYS

United States Patent Office 3,562,871
Patented Feb. 16, 1971

3,562,871
ENDLESS BELT ASSEMBLY WITH INSERT COUPLING
Arnold G. Peterson, Sunapee, N.H., assignor to L. M. & L. Corporation, Claremont, N.H., a corporation of New Hampshire
Original application July 6, 1967, Ser. No. 651,527, now Patent No. 3,461,733, dated Aug. 19, 1969. Divided and this application Apr. 4, 1969, Ser. No. 831,803
Int. Cl. F16h 9/00
U.S. Cl. 24—31
4 Claims

ABSTRACT OF THE DISCLOSURE

A continuous belt assembly suitable for use in high-velocity, moderate-load power transmission applications comprising, in combination, a novel internal coupling means and a tough extensible, flexible and tear resistant polymeric belting. The fastening means comprises sharp holding edges at either end thereof, such edges being adapted to indent, deform, cut and grip the walls of the belting when said fastening device is inserted into hollow sections of the belting and the belting is subsequently mounted on machinery. The sharp edged insert is free of sharp prongs and undercut barbs, but includes sharp spade-like edges defining a figure of greater periphery than the inside diameter of the hollow tubular belting, the corner edges having obtuse angles on the periphery to limit fracture while deforming the tube into a tight stretch around the periphery.

This is a division of application Ser. No. 651,527, filed July 6, 1967 and now Pat. No. 3,461,733, issued Aug. 19, 1969.

BACKGROUND OF THE INVENTION

This invention relates to power transmission means and, more particularly, to a novel endless belt assembly having a novel fastening means and a polymeric belt component of selected physical properties.

The advent of extruded lengths of polymeric materials has been accompanied by efforts to adapt such materials to endless belt applications. A number of fastening means were available for the purpose of connecting two free ends of belting together to form a continuous length. For example, fasteners such as hose couplings could be used; moreover, since many of the materials were melt-able, melt-fusion techniques were also used to form continuous belts. Such methods as these, however, left much to be desired; they normally require special equipment and techniques and are difficult to apply on equipment where there is little room to work and where the belt must be formed in situ.

Other types of sharp pointed prongs or barb connector devices tended to tear unreinforced polymeric belting material within an undesirably short time under only moderately severe service conditions.

Thus it is a principal object of the present invention to provide a power transmission means which consists of an easily connected endless belt useful under high loads and high velocities for long periods of time without excessive deterioration or tearing of the belt.

It is a further object of the invention to provide an endless belt assembly which can be quickly mounted in a minimum of time and space in situ on a machine without the use of tools.

Another object of the invention is to provide an endless belt assembly with good frictional characteristics for power transmission applications.

Another object of the invention is to provide a novel fastening means for use in the endless belt assembly of the invention.

SUMMARY OF THE INVENTION

Applicant has achieved these objects by utilizing (1) a belting comprised of a tough, tear-resistant, and elastic polymer having good abrasion resistance and excellent frictional characteristics for transmitting power between even rather smooth pulley surfaces, together with (2) a coupling means having multiple sharp edges on gripping heads and relatively blunt corner points at each end thereof, the sharp edges being adapted for cutting and gripping, but not tearing the aforesaid polymeric belting.

The criticality and function of various attributes advantageously possessed by the polymer for coaction with the novel coupling means are discussed hereinbelow.

Toughness and tear resistance

These characteristics allow the polymeric belting to withstand any cutting action of the coupling means and, further, to withstand the tension on the points, resulting from the predetermined deformation of the belt without progressive tearing of the belting.

Elasticity

The polymeric belting in order to be most easily fitted onto some types of equipment must be stretchable at tensions reasonably exertable by a workman. Moreover, the material must then snap back so that it will fit snugly over the pulleys for efficient power transmission.

Abrasion resistance

Belting in high-speed friction-transfer, power transmission applications is subjected to frictional wear. A belting selected for the practice of the instant invention ran successfully for three times as long as the worn belting which it replaced in a typical application. Furthermore at the end of this time, there was no sign of deterioration.

In general belting used in the instant invention should be constructed of a belting having the following characteristics.

Tear strength; Die B, nicked—at least about 200 lbs. per inch.

Tensile strength elongation

The belting should be sufficiently easy to elongate so that an ordinary workman can extend the length of the belt by at least about 4% to 10%. A belt of the invention, therefore, should require no more than about ten pounds force to elongate it to about 4%; preferably not more than about five pounds are required. Translated into terms of tensile strength at low elongation rate, the polymer of the invention should have a tensile strength of not more than about 200 p.s.i. at the aforesaid 4% elongation; preferably not more than about 100 p.s.i. at temperatures of about 25° C. These latter values are based on an assumption that the belting has a cross-sectional area approximately the same as that of the illustrative example of this invention.

One polymer that ideally suits these requirements is a thermoplastic polyurethane such as that sold under the trade designation MP-1485 by Molded Products Division of the Easthampton Rubber Thread Company.

In the drawing:
FIG. 1 is a side elevation, in section, of a fragment of a belt transmission means according to the invention;
FIG. 2 is an end view in section on line 2—2 of FIG. 1;
FIG. 3 is a view of the device of FIG. 1 turned through an angle of 90°;
FIG. 4 is an end view partly in section on line 4—4 of FIG. 3;

FIGS. 5 and 6 are end views of other embodiments of the sharp edged, blunt corner pointed insert of the invention;

FIG. 7 is a side elevation of an insert of the invention having multiple identical heads at each opposite end thereof;

FIG. 8 is a side elevation of a device of the invention with one half of the insert protruding from one end of a belt;

FIG. 9 is an elevation of an endless tubular belt assembly of the invention, and FIG. 10 shows the belt assembly of the invention in use in a typical machine such as a spinning frame.

As shown in the drawing, 20 designates a hollow, tubular elastomeric belt having an exterior normally cylindrical face 21 of predetermined outside diameter, an interior normally cylindrical face 22 of predetermined inside diameter, and the interior space 23. Belt 20 may be cut to any desired length so that the opposite free ends 24 and 25 may be joined to form the endless closed loop shown in FIGS. 9 and 10. It will be apparent that tubing of solid cross section could be used in the device of the invention, with a suitable cavity at each opposite end, but that hollow tubing is more practical and readily adapted to cutting into desired lengths.

The coupling means 27 is unitary and symmetrical, being formed of one piece of suitable material such as a tough plastic, metal or the like, usually by molding. It comprises the cylindrical shank or shaft 28, of a diameter equal to, or preferably slightly less than, the inside diameter of the interior face 22 of belt tubing 20, and a pair of identical integral heads 29 and 30. Each head, such as 30, is of pyramidal, or frustro-pyramidal configuration with at least four flat, planar, inclined faces 32, 33, 34, and 35 having a pointed apex 36, or terminating at face 37 in a common plane, at the small end, which is in parallelism with the base face 38 at the large end, both planes being normal to the longitudinal central axis of shank 28.

Each head, such as 30, therefore, includes at least four spade-like, sharp, gripping edges, 40, 41, 42 and 43, which in the case of the four-sided pyramid illustrated define a square with four right angular corners, or points, 44, 45, 46, and 47 (FIG. 2). The rearwardly inclined faces 32, 33, 34 and 35 permit the easy insertion of each head 29 or 30 into a free end 24 or 25 of the tubular belt 20, the peripheral length of the four edges 40, 41, 42 and 43 being about equal to, or slightly greater than the circumferential length of the interior face 22, so that the spade-like edges indent and deform the tube into square cross section while the resilient tube exerts inward tension on the head. Each corner point, such as 44, is relatively blunt compared to conventional prongs and barbs of the prior art, so that cutting or fracture is limited while achieving a friction grip and a bulging of the tube material in advance of the spade edges and corner points.

The structure and dimensions of the insert coupling 27 are such that the free ends 24 and 25 of the tube while bulged to square configuration at the heads 29 and 30, tend to close over toward the shank 28 with the material of the tube drawn or pulled into a smaller diameter to touch the shank and reduce the diameter of space 23 to less than that of its normal interior diameter.

In the particular example illustrated, the outside diameter of the belt is .195 inch, the inside diameter of the belt is .080 inch and the diagonals of each head are about .150 inch. Thus the corner points tend to indent the tube a distance of about .035 inch on each opposite corner with the tube bulging accordingly at each corner and flattening accordingly between corners. The thickness of the tube wall is about .0575 inch.

In FIG. 5, another embodiment 50 of the insert coupling means is shown which is identical with insert 27 except that the grip edges 40, 41, 42 and 43 have been cut away at 51, 52, 53 and 54, thereby reducing edge contact but retaining the bluntness of the corner points 44, 45, 46 and 47. It is believed that leaving sufficient side edge portions at the points, as at 55 and 56, supports the inner face of the tube despite its tension and prevents the excessive penetration or cutting which would take place with an acute angle point.

In FIG. 6, another embodiment is shown in which the head has eight inclined faces such as 61, eight grip edges, such as 62, and eight grip corner points, such as 63.

In FIG. 7 a double headed insert 70 is shown, the heads 29 and 30 being integral with the shank 28.

In FIG. 10, a typical textile spinning frame 80 is shown of the type in which perhaps one hundred spindles on each side are each driven by an individual belt. It is usually impossible to replace a closed, one piece loop belt in such a machine because of other parts and inability to adjust length. The belt of this invention is easily cut to the correct length, trained on the pulleys 81 and 82 and joined at the free ends by manually pressing the insert into position. Typically, the belt will operate under a tension of about ten pounds and at about three thousand r.p.m., but will withstand considerably greater tension without separating at the joint.

The pyramidal configuration of the heads of the insert coupling of the invention, with its resultant prismatic corner points spaced widely apart around the circumference of the tube has been found to avoid cutting into the material of the tube under light load conditions of up to three pounds. Under loads of three pounds, or more, the corner points will partially cut and penetrate into the material, the penetration being minor and not spreading because of the shape of the points, the spacing of the points and the toughness of the polymeric belting.

The particular belt illustrated is designed to run at the maximum of 4000 r.p.m., a running load of five pounds and twenty pounds starting torque at the point of connection. The corner points will indent and cut into the tube wall, under these conditions, but will not continue to cut or tear, as would a plow cutting a furrow, because of the flat leading edges of the heads. The insert coupling illustrated has been found to function satisfactorily with a belt of larger dimensions than those illustrated herein, namely with an outside diameter of .090 inch. The larger size belt fully encloses itself over the barbed heads of the insert when running at two-thirds of the following maximum values. The maximum values are 15,000 r.p.m., a running load of fifteen pounds, and a starting torque of forty pounds.

What is claimed is:

1. A coupling means, suitable for use with elastomeric tubing and the like, comprising
   a center shaft,
   gripping heads, at least one at each opposite end of said shaft, each having a plurality of diverging spreading surfaces terminating in a plurality of sharp gripping edges,
   said edges joining to form a plurality of spaced corner points adapted to indent and cut into said elastomeric tubing.

2. A coupling means as defined in claim 1, wherein there is an angle of at least about 90° between said center shaft and the back of said gripping heads.

3. A coupling means as defined in claim 1, wherein said gripping edges outline a polygonal figure, all angular corners of which are at least 90° for avoiding the cutting tendency of acute angular corners.

4. A connector, or insert, for joining the opposite ends of a hollow tubular round section endless belt of predetermined inside and outside diameter, said connector comprising
   a one-piece body having a pair of identical end heads separated by a short shank of predetermined diameter substantially equal to the inside diameter of said tubular belt, each said end head being of generally frustro-pyramidal configuration with the larger area, square base face thereof integral with one of the ends of said shank, the smaller area, square face thereof at the free terminal end of said insert and the four inclined side faces thereof forming four relatively blunt corner points with the adjacent larger base face, said four points outlining a circle, in a plane normal to the axis of said shank, of greater diameter than the inside diameter of said hollow tubular endless belt, whereby each end head of said insert is insertable in one end of said belt by slightly deforming and enlarging the same to pass said points, said points create a bulge in said belt at a spaced distance within the adjacent belt end, the belt is deformed to conform with the square base face, and the belt end portion surrounding said shank is deformed inwardly toward said shank, thereby holding said head in position.

References Cited
UNITED STATES PATENTS 311,883   2/1885   England   24—31.2UX
1,271,014   7/1918   Bower   74—238

DONALD A. GRIFFIN, Primary Examiner